US012621596B2

(12) United States Patent
O'Callaghan et al.

(10) Patent No.: US 12,621,596 B2
(45) Date of Patent: May 5, 2026

(54) EAR WORN DEVICE

(71) Applicant: Bose Corporation, Framingham, MA (US)

(72) Inventors: Pauline O'Callaghan, Medford, MA (US); John Usher, Berlin (DE)

(73) Assignee: Bose Corporation, Framingham, MA (US)

(*) Notice: Subject to any disclaimer, the term of this patent is extended or adjusted under 35 U.S.C. 154(b) by 0 days.

(21) Appl. No.: 17/998,043

(22) PCT Filed: May 7, 2021

(86) PCT No.: PCT/EP2021/062229
§ 371 (c)(1),
(2) Date: Nov. 7, 2022

(87) PCT Pub. No.: WO2021/224497
PCT Pub. Date: Nov. 11, 2021

(65) Prior Publication Data

US 2023/0179901 A1 Jun. 8, 2023

(30) Foreign Application Priority Data

May 7, 2020 (EP) .................................... 20173494
Nov. 5, 2020 (EP) .................................... 20205999

(51) Int. Cl.
*H04R 5/02* (2006.01)
*H04R 1/10* (2006.01)
*H04R 25/00* (2006.01)

(52) U.S. Cl.
CPC ........... *H04R 1/1016* (2013.01); *H04R 1/105* (2013.01); *H04R 25/48* (2013.01);
(Continued)

(58) Field of Classification Search
CPC ...... H04R 1/1016; H04R 1/105; H04R 25/48; H04R 2225/0216; H04R 2225/0213; H04R 2201/107; H04R 2225/51; H04R 2420/07
(Continued)

(56) References Cited

U.S. PATENT DOCUMENTS 6,775,389 B2 8/2004 Harrison et al.
9,282,412 B2 * 3/2016 Duisters ................ H04R 25/30
(Continued)

FOREIGN PATENT DOCUMENTS

WO 2019015764 1/2019

*Primary Examiner* — Ammar T Hamid

(57) ABSTRACT

The invention relates to an ear worn device (1), particularly a wireless headphone or a hearing aid, comprising a first module (10) configured to be inserted at least partially into an ear canal (2*a*) of a user, wherein the first module (10) comprises a loudspeaker (11) configured to emit sound into the ear canal (2*a*) of the user, and wherein the first module (10) comprises at least one microphone (12, 13) configured to pick up sound, and a second module (20) configured to be arranged outside of the concha cava (2*b*) adjacent to said ear canal (2*a*) of the user when the first module (10) is inserted into said ear canal (2*a*), wherein the second module (20) comprises at least one electronic component (21) which is operatively coupled to the loudspeaker (11) and/or the at least one microphone (12, 13) of the first module, wherein the first ambient microphone (12) is configured to be arranged behind the tragus (2*c*) of the ear (2) of the user adjacent to the ear canal (2*a*) and faces away from the ear canal (2*a*).

13 Claims, 7 Drawing Sheets

(52) U.S. Cl.
CPC .................. *H04R 2201/107* (2013.01); *H04R 2225/0213* (2019.05); *H04R 2225/0216* (2019.05); *H04R 2225/51* (2013.01); *H04R 2420/07* (2013.01)

(58) Field of Classification Search
USPC .................................................... 381/311, 74
See application file for complete search history.

(56) References Cited

U.S. PATENT DOCUMENTS

| | | | | |
|---|---|---|---|---|
| 10,327,078 | B2 * | 6/2019 | Pedersen .............. | H04R 25/405 |
| 2009/0123010 | A1 | 5/2009 | Cano et al. | |
| 2009/0290739 | A1 | 11/2009 | Edwards et al. | |
| 2012/0008808 | A1 | 1/2012 | Saltykov | |
| 2017/0347177 | A1 | 11/2017 | Masaki et al. | |
| 2019/0253793 | A1 * | 8/2019 | Pedersen ................ | H04R 25/60 |

* cited by examiner

EAR WORN DEVICE

CROSS-REFERENCE TO RELATED APPLICATION

This is the U.S. National Stage of International Patent Application No. PCT/EP2021/062229 filed May 7, 2021, which claims priority to European Patent Application No. 20205999.4 filed Nov. 5, 2020, and European Patent Application No. 20173494.4 filed May 7, 2020.

The invention relates to an ear worn device, particularly a wireless headphone or a hearing aid.

To selectively play back ambient sound into the ear (referred to as transparency mode in case of wireless headphones), ear worn devices comprising ambient microphones and signal processing means configured to process ambient sounds are known from the prior art.

Furthermore, hearing aids according to the prior art amplify environmental sounds and play those sounds back to users with impaired hearing.

However, in both described cases, the played-back sounds are often perceived as unnatural, which is in part due to the inability to reproduce the natural filtering properties of the human ear.

Therefore, the objective of the present invention is to provide an ear worn device with improved filtering abilities to achieve a more natural perception of ambient sounds.

This objective is attained, and embodiments of the invention are specified, by the subject matter of the claims and are described hereafter.

A first aspect of the invention relates to an ear worn device, particularly a wireless headphone or a hearing aid, comprising a first module (herein also referred to as "transducer bundle") configured to be inserted at least partially into an ear canal of a user. The first module comprises a loudspeaker configured to emit sound into the ear canal of the user, particularly when the first module is inserted into the ear canal. The first module further comprises at least one microphone, particularly comprising a first ambient microphone, configured to pick up sound.

The ear worn device further comprises a second module (herein also referred to as "main electronics bundle"), wherein the second module is configured to be arranged outside of the concha cava adjacent to the ear canal of the user when the first module is inserted into the ear canal. The second module comprises at least one electronic component which is operatively coupled to the loudspeaker and/or the at least one microphone of the first module.

The ear worn device, particularly the first module, more particularly the at least one microphone, comprises a first ambient microphone, wherein the first ambient microphone is configured to be arranged behind the tragus of the ear of the user adjacent to the ear canal when the first module is inserted at least partially into the ear canal, such that the concha cava of the ear of the user remains unobstructed. The first ambient microphone faces away from the ear canal of the user when the first module is inserted at least partially into the ear canal.

Environmental sounds may be picked up by the first ambient microphone very close to the natural location where sound filtered by the outer ear enters the ear canal. In this manner, the environmental sounds can be picked up in a sound quality which is very similar to natural perception without headphones or hearing aids. In addition, the first ambient microphone may be used to pick up the user's own voice, e.g. for voice calls or for talking to an automatic voice assistant.

The invention differs from current ear worn devices in that the electronics are split into two parts, a first module and a second module.

The main transducers (e.g., loudspeakers, microphones and some sensors, such as optical sensors configured to measure the heart rate or the blood oxygen saturation of the wearer) are housed inside the ear canal and, in particular, the rest of the electronics are housed outside of the ear.

This enables a novel feature that may be referred to as 'natural transparency' in case of wireless headphones. Because this configuration allows the ambient microphone to be placed at the entrance to the ear canal (behind the tragus), and the concha cava to remain unobstructed, sounds picked up from the environment benefit from the natural filtering of the ear's anatomy. This natural filtering, when paired with relevant signal processing algorithms, allows the user to maintain spatial awareness when wearing the ear worn device (both in case of wireless headphones and hearing aids).

The system (ear worn device) according to the invention comprises two main parts: The transducer bundle or first module sits at least partly inside the wearer's ear canal. In particular, it should be small enough to fit into the majority of adult ear canals so that the outermost part sits behind the tragus. The main electronics bundle or second module sits outside of the user's ear (e.g. in front of the ear or behind the ear), particularly housed in an ergonomically designed enclosure, e.g. an injection moulded plastic case with some silicone coverings. The main electronics bundle is electrically connected to the transducer bundle (e.g. by means of a flexible PCB or wire harness).

In certain embodiments, the ear worn device of the invention is configured to pick up sounds from the environment with microphones. In certain embodiments, the ear worn device is configured to perform signal processing on these sounds. In certain embodiments, the ear worn device is configured to play the processed sounds back to a speaker inside the wearer's ear canal, all with an imperceptible delay so that the wearer hears the sounds in real time.

In certain embodiments, the ear worn device may form part of a pair of devices in the category of True Wireless Headphones. In certain embodiments, the ear worn device is a configuration for a hearing aid device.

In certain embodiments, the ear worn device comprises an earpiece configured to be inserted at least partially into the ear canal, wherein the earpiece comprises the first module and wherein the ear worn device comprises a main body connected to the earpiece, wherein the main body comprises the second module, and wherein particularly the main body comprises a first section connected to the earpiece, wherein the ear worn device is configured such that the first section extends upward from the ear canal behind the tragus towards the helicis crus of the ear when the earpiece is inserted into the ear canal, such that the concha cava of the ear remains unobstructed.

Alternatively, in particular, the main body of the ear worn device may be configured to be arranged behind the ear, particularly behind the auricle of the ear, when the user is wearing the ear worn device.

The described shape of the main body results in the concha cava being unobstructed while wearing the ear worn device, such that the natural filtering abilities of the ear, particularly by the pinna of the ear, may be advantageously used to naturally play back environmental sounds, and to improve spatial awareness of the wearer.

In certain embodiments, the main body further comprises a second section connected to the first section, wherein the ear worn device is configured such that the second section extends from the helicis crus along an outside of the helix of the ear of the user when the earpiece is inserted at least partially into the ear canal of the ear. In particular, the second section follows the contour of the helix of the ear, wherein more particularly the second section is curved or the second section comprises at least two straight subsections arranged at an angle between 0° and 45° with respect to each other.

This shape of the main body advantageously leaves most parts of the outer ear unobstructed, further improving the natural filtering ability of the ear to be used to play back natural environmental sounds into the ear canal by the loudspeaker.

In certain embodiments, the main body further comprises a third section connected to the second section, wherein the third section forms a hook configured to be arranged behind the auricle of the ear when the earpiece is inserted at least partially into the ear canal of the ear.

The third section firmly and securely attaches the ear worn device at the ear.

In certain embodiments, the earpiece comprises a core part and a sleeve part, wherein the sleeve part is mechanically connectable to the core part, such that the sleeve part is arranged around the core part. The sleeve part is configured to be in contact with the internal surface of the ear canal when the earpiece is inserted into the ear canal. In particular, the sleeve part comprises a flexible material (e.g., silicone) which is adaptable to the shape of the ear canal when the earpiece is inserted into the ear canal. In particular, the core part comprises a housing from a material which is more rigid than the flexible material of the sleeve part.

In certain embodiments, the sleeve part comprises a skin contact sensor, particularly a biometric sensor, more particularly a photoplethysmographic (PPG) sensor, an electroencephalogram (EEG) electrode or a contact microphone. The skin contact sensor is arranged at the surface of the sleeve part, such that the skin contact sensor is in contact with the skin on the inner surface of the ear canal when the earpiece is inserted in the ear canal. In particular, the skin contact sensor may be formed by a flexible electronic component.

In certain embodiments, the skin contact sensor, particularly the biometric sensor on the sleeve part is a contact thermometer. The contact thermometer can be embedded in the sleeve. An advantage is that embedded in the sleeve, the contact thermometer can be in contact with the skin in a location that has core body temperature (when the earpiece is inserted into the ear canal). An advantage of the contact thermometer embedded in the sleeve is that it can be easily integrated in the device. The costs are reduced advantageously by remaining the efficiency of the thermometer.

In certain embodiments, the contact microphone comprises a microsensor comprising a first sensing electrode connected to a proof mass and a second sensing electrode spaced apart from the proof mass, particularly by a gap of 1-999 nm. In certain embodiments, the contact microphone further comprises a means to convert a voltage between the first and second sensing electrodes into an electrical signal. In this manner, faint sounds from inside the human body can be detected.

In headphones with PPG sensors according to the prior art, the PPG sensor is particularly arranged in the concha cava when the user is wearing the headphones. The above-described embodiment ensures that the concha cava is unobstructed to make use of the natural filtering abilities of the ear.

In certain embodiments, the sleeve part comprises at least one connection contact for electric connection to a corresponding connection contact of the core part.

In certain embodiments, the core part comprises the loudspeaker and the at least one microphone, particularly the first ambient microphone. In certain embodiments, the core part comprises a temperature sensor. In certain embodiments, the core part comprises at least one electrical connection for connection to the second module, particularly in the main body.

In certain embodiments, the sleeve part and the core part are connectable by a plug-in connection, particularly configured such that the connection contacts of the sleeve part and the core part are aligned to be electrically connected. The plug-in connection enables the user to easily switch the sleeve part to obtain an optimal fit to the ear canal.

In certain embodiments, the sleeve part is custom-fit to the user's ear canal. In this case, the outer shape of the sleeve part fits the exact shape of the user's ear canal.

In certain embodiments, the at least one microphone of the first module comprises an in-ear microphone configured to pick up sound from inside the ear canal of the user. In particular, the in-ear microphone faces into the ear canal of the user when the first module is at least partially inserted into the ear canal.

By means of the in-ear microphone, audio signals of sounds from inside the wearer's body, e.g., the wearer's own voice or chewing noises, can be picked up and taken into account during sound processing to recreate natural hearing by the ear worn device. In addition, at least some of the audio signals picked up by the in-ear microphone can be used as biometric data.

In certain embodiments, the first module comprises at least one biometric sensor configured to pick up a biometric signal. In particular, the at least one electronic component of the second module is operatively coupled to the biometric sensor. In particular, the biometric signal is a heart rate, a blood oxygen saturation, a body temperature, a respiration rate, a blood glucose level, a hormone level of the user, or a sound signal picked up from inside the body of the user, wherein more particularly the biometric sensor is a photoplethysmographic (PPG) sensor.

In certain embodiments, the at least one biometric sensor comprises an infrared sensor configured to be facing into the ear canal of the user when the user is wearing the ear worn device, wherein particularly the infrared sensor is configured to measure a body temperature of the user.

In certain embodiments, the ear worn device comprises a first electrode and a second electrode configured to detect a galvanic skin response, an electroencephalogram or an electrocardiogram, wherein particularly the first electrode is comprised in the first module and the second electrode is comprised in the second module.

In certain embodiments, the first electrode and the second electrode are spaced apart from each other, particularly wherein the first electrode is comprised in the first module and the second electrode is comprised in the second module, wherein the first electrode and the second electrode are configured to detect an electroencephalogram or an electro electroencephalogram signal.

In certain embodiments, the ear worn device comprises at least one further electrode (in addition to the first electrode and the second electrode) to detect the galvanic skin, response, the electroencephalogram or the electrocardiogram. In particular, the at least one further electrode is spaced apart from the first electrode and/or from the second electrode.

Such sensors advantageously extend the functionality of the ear worn device beyond that of standard headphones and hearing aids. The picked up biometric data can be transmitted, e.g. to a smart phone or tablet computer of the wearer and further analyzed or viewed. In addition, the biometric signals could also be used to detect a medical condition of the wearer, such as a beginning heart attack or stroke. In this case, an alarm could be automatically triggered and medical personnel could be automatically notified to initiate further action. In certain embodiments, the ear worn device, particularly the first module, comprises a contact sensor, configured to pick up sounds from inside the body of the user when the user wears the ear worn device, particularly when the first module is inserted at least partially into the ear canal of the user. In particular, the contact sensor comprises a contact microphone. In particular, the contact sensor is configured to be placed against an inside surface of the ear canal of the user when the user is wearing the ear worn device. In particular, the contact sensor is configured to contact the skin on the inner surface of the ear canal, wherein the contact sensor is oriented perpendicular to the ear canal. In particular, the sound signals picked up by the contact sensor can be used as biometric data or for sound processing.

In certain embodiments, the ear worn device comprises a housing covering at least the first module, wherein the housing is configured to seal the ear canal of the user.

In certain embodiments, the first module comprises an electronic part comprising at least the loudspeaker and the at least one microphone, particularly the first ambient microphone and the in-ear microphone of the first module.

In certain embodiments, the first module comprises a first ambient microphone that picks up sounds from the wearer's environment. In particular, this microphone sits close to the entrance to the ear canal, behind the tragus, and faces away from the ear canal (in particular, the first ambient microphone is a MEMS digital microphone).

In certain embodiments, the first module comprises a loudspeaker facing into the user's ear canal to playback sounds to the user (in particular, the loudspeaker is a MEMS loudspeaker, a balanced armature or an electrodynamic loudspeaker).

In certain embodiments, the first module comprises an in-ear microphone facing into the user's ear canal to pick up sound inside the ear canal (in particular, the in-ear microphone is a MEMS digital microphone).

In certain embodiments, the first module comprises a sensor or sensors to pick up biometric signals from the wearer, e.g. heart rate, SpO2, core body temperature, respiration rate (this sensor may also be used to detect whether the user is wearing the device).

In certain embodiments, the first module comprises connection points (e.g. solder pads or a connector component) that allow electric connection of the transducer bundle (first module) to the main electronics bundle (second module).

In certain embodiments, the first module comprises a flexible substrate onto which the transducers and wire connection points are affixed.

In certain embodiments, the first module comprises materials and a structure (e.g. a housing) that houses all of the above, fits comfortably and securely into the wearer's ear and provides the necessary passive attenuation of noise to enable the overall purpose of the device, e.g. if noise cancelling is required, the overall transducer bundle should create a seal in the ear canal to prevent sounds leaking through.

In certain embodiments, the first module comprises an electronic component, e.g., a silicone component comprising the loudspeaker, the first ambient microphone, the in-ear microphone and/or the biometric sensor.

In certain embodiments, the second module comprises at least one second ambient microphone forming a microphone array with the first ambient microphone of the first module to achieve directional listening. In particular, the first ambient microphone and the second ambient microphone are spaced apart by at least 1 cm, more particularly in a horizontal direction. In particular, the second ambient microphone may also be used to pick up the user's own voice, e.g. for voice calls or for talking to an automatic voice assistant.

In certain embodiments, the second module comprises a power source, particularly a rechargeable battery, which is electrically connected to the loudspeaker and/or the first ambient microphone and/or the in-ear microphone to provide electrical energy to the loudspeaker, the first ambient microphone and/or the in-ear microphone.

In certain embodiments, the second module comprises a control device, particularly a microprocessor chip, configured to control components of the first module and/or the second module, wherein particularly the control device is comprised in the at least one electronic component.

In certain embodiments, the second module comprises an amplifier configured to drive the loudspeaker of the first module, wherein particularly the amplifier is comprised in the at least one electronic component.

In certain embodiments, the second module comprises a movement and/or acceleration sensor, particularly an inertial measurement unit, wherein particularly the movement and/or acceleration sensor is comprised in the at least one electronic component.

In certain embodiments, the second module comprises an altimeter, an ambient temperature sensor, an air quality sensor and/or a humidity sensor.

In certain embodiments, the second module comprises a memory device configured to store data, wherein particularly the memory device is comprised in the at least one electronic component. This memory may be used, e.g., to store data generated from the at least one biometric sensor, or store data generated during sound processing of the picked-up sounds.

In certain embodiments, the second module comprises a user interface, particularly comprising a button, e.g., a mechanical switch, a touch sensor, e.g., a capacitive sensor, a force sensor and/or a light emitting diode. Such a user interface can be used to receive input from the user, particularly to change operation of the electro acoustic system of the ear worn device, e.g. to accept or reject an incoming call, switch an active noise control function on or off or change the volume of audio playback.

In certain embodiments, the second module comprises a communication device, particularly comprising a radio antenna, more particularly a radio antenna configured to receive and/or transmit signals at a frequency between 2,402 GHz and 2,480 GHz, wherein particularly the communication device is comprised in the at least one electronic component.

In particular, the communication device may be used to receive data from a mobile device, e.g. a smart phone, of the wearer, e.g. to play back an audio file. In addition, the communication device may be used to transmit data, e.g. biometric data picked up by the at least one biometric sensor, to the mobile device of the wearer.

In certain embodiments, the second module comprises a signal processing device configured to process signals obtained from the first ambient microphone, the second ambient microphone and/or the in-ear microphone, wherein particularly the ear worn device is configured to play back the processed signals to the loudspeaker of the first module, wherein particularly the signal processing device is comprised in the at least one electronic component.

Using the signal processing device, signal processing algorithms may be performed on the picked-up sound signal from the at least one microphone, and the processed sound signal may be played back via the loudspeaker, e.g. to perform noise cancelling, or selectively play back certain environmental sounds.

In certain embodiments, the at least one electronic component is operatively coupled to the loudspeaker and/or the at least one microphone of the first module by an electric connection, particularly a wire connection or a connection via the electric contacts of a printed circuit board, more particularly a flexible printed circuit board, or a data connection, particularly a wireless data connection.

In certain embodiments, the second module comprises a rechargeable battery, e.g. lithium ion coin cell.

In certain embodiments, the second module comprises a main printed circuit board, PCB, which may comprise rigid and flexible parts.

In certain embodiments, the PCB accommodates or comprises a microprocessor chip and particularly associated passives.

In certain embodiments, the PCB accommodates or comprises a radio chip and particularly associated passives (in particular, the radio chip is a Bluetooth chip).

In certain embodiments, the PCB accommodates or comprises power management electronics, e.g. for voltage regulation and battery charge management.

In certain embodiments, the microprocessor chip (particularly with associated passives), the radio chip (particularly with associated passives) and/or the power management electronics are contained on a single System-on-Chip (SoC).

In certain embodiments, the PCB accommodates or comprises a speaker amplifier capable of driving the loudspeaker in the transducer bundle (first module).

In certain embodiments, the PCB accommodates or comprises a sensor or sensors relevant to the purpose of the device, e.g. an inertial measurement unit, IMU.

In certain embodiments, the PCB accommodates or comprises a memory, e.g. a flash memory for storage and retrieval of data.

In certain embodiments, the PCB accommodates or comprises at least one second ambient microphone to form a microphone array along with the transducer bundle ambient microphone (first ambient microphone) in order to achieve directional listening features (the second ambient microphone(s) is/are particularly (a) MEMS digital microphone (s).

In certain embodiments, the PCB accommodates or comprises an LED to form part of the user interface to the device.

In certain embodiments, the PCB accommodates or comprises an input sensor or sensors, e.g. button, touch sensor, force sensor, to form part of the user interface to the device.

In certain embodiments, the PCB accommodates or comprises an antenna for the radio (in particular 2.4 GHz for a Bluetooth radio), particularly in the form of a piece of bent metal, a PCB or a printed antenna affixed to the case/housing of the device.

In certain embodiments, the PCB accommodates or comprises metal contacts for connection to a battery charge or data transfer circuit.

In certain embodiments, the second module comprises a haptic transducer, e.g., to create a vibration in response to a user input, e.g., a manual user button action.

Wherever alternatives for single separable features are laid out herein as "embodiments", it is to be understood that such alternatives may be combined freely to form discrete embodiments of the invention disclosed herein.

The invention is further illustrated by the following examples and figures, from which further embodiments and advantages can be drawn. These examples are meant to illustrate the invention but not to limit its scope.

Figure 1:
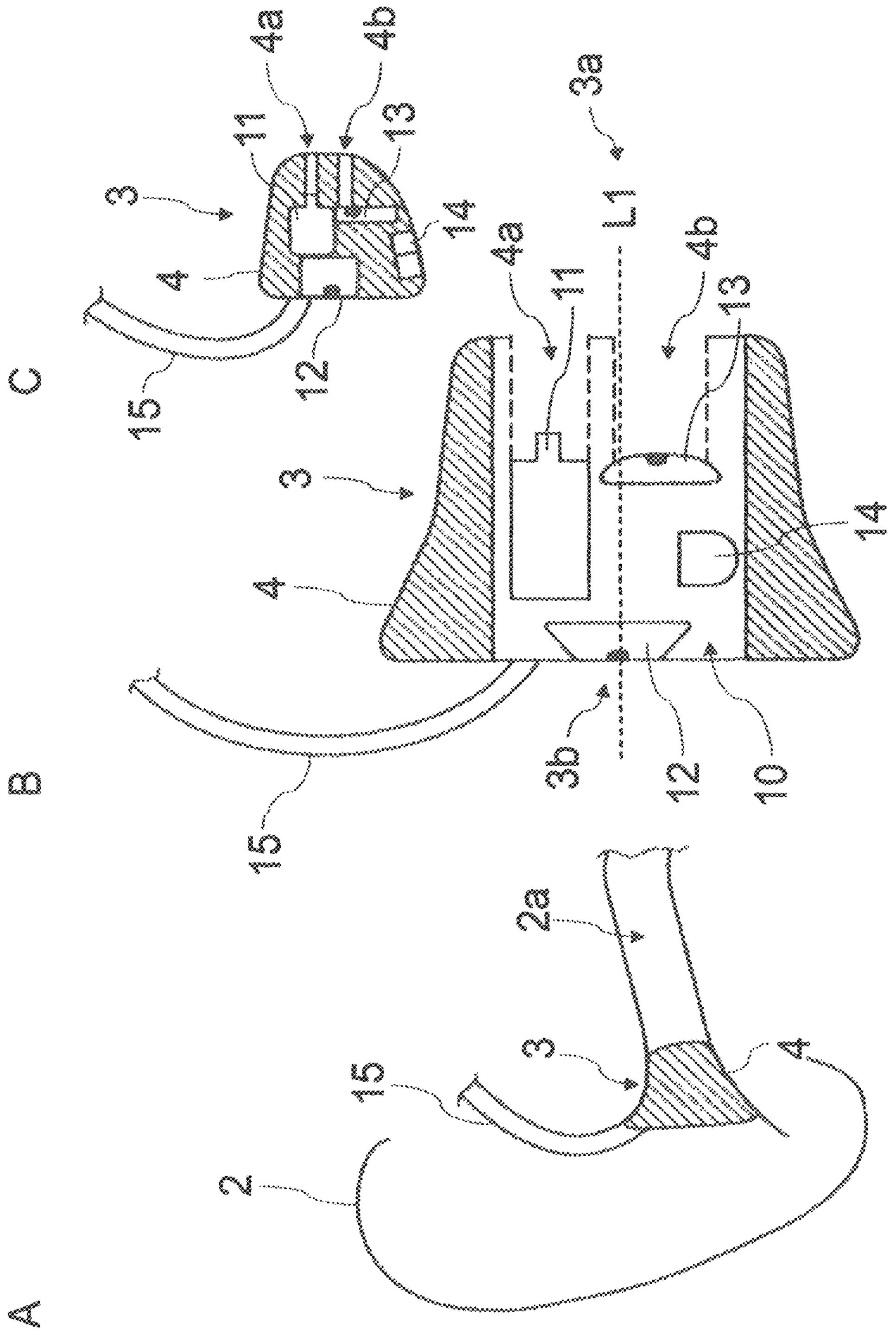
FIG. 1 shows a schematic of an example of an earpiece comprising the first module according to the invention.

FIG. 1A shows an overview of an earpiece 3 of the ear worn device 1 (particularly true wireless headphones) according to the invention which is inserted partially into an ear canal 2*a* of an ear 2. Electrical connections 15 connecting the internal parts of the earpiece 3 to the main body 5 of the ear worn device 1 (see FIG. 4) are shown.

The earpiece 3 comprises a housing 4 which is particularly manufactured from a soft flexible material such as silicone, which adapts to the dimensions of the ear canal 2*a* of the wearer and particularly seals the ear canal 2*a* for noise reduction purposes.

A more detailed sectional view of the earpiece 3 showing the internal components is depicted in FIG. 1B. As shown in FIG. 1B, the earpiece 3 extends between a first end 3*a* and a second end 3*b* along a first longitudinal axis L1, which essentially extends parallel to the ear canal 2*a* when the earpiece 3 is inserted into the ear canal 2*a* (see FIG. 1A). When the earpiece 3 is inserted into the ear canal 2*a*, the first end 3*a* is facing the ear canal 2*a* and the second end 3*b* is facing outside. To aid insertion into the ear canal 2*a*, the housing 4 tapers towards the first end 3*a*.

Figure 2:
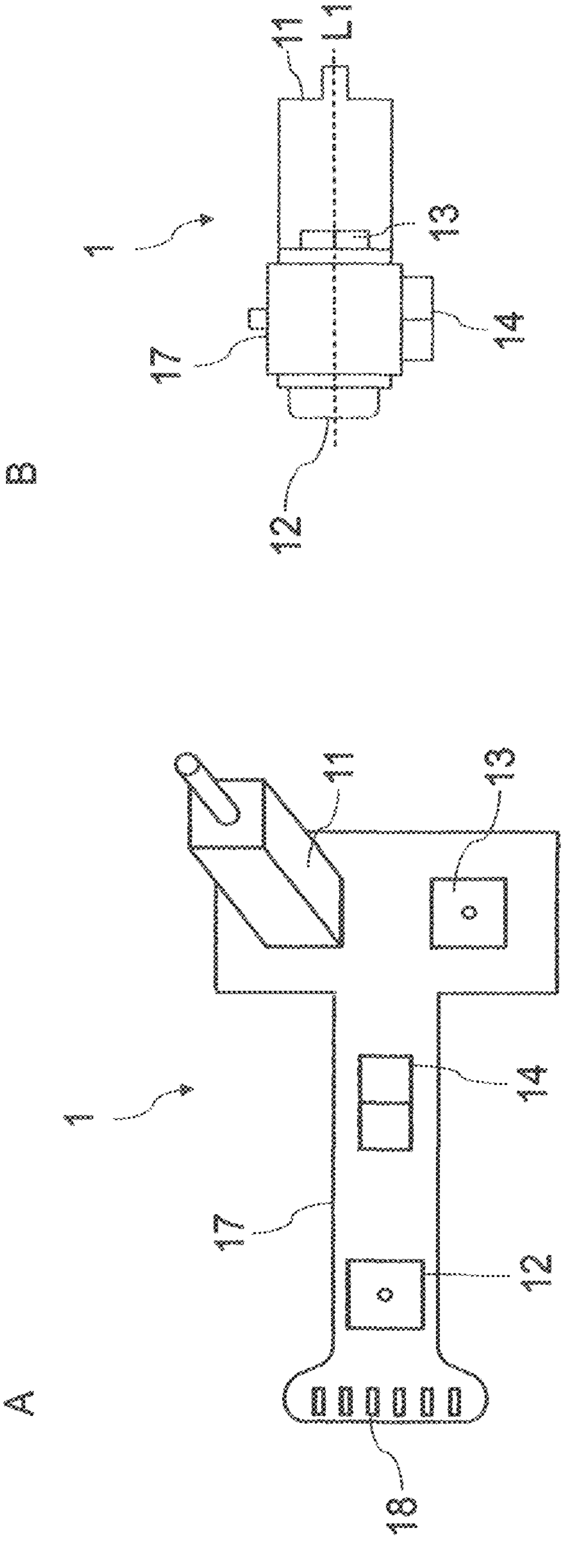
FIG. 2 shows a schematic of a first example of a flexible PCB of the first module according to the invention comprising a balanced armature loudspeaker.
Figure 3:
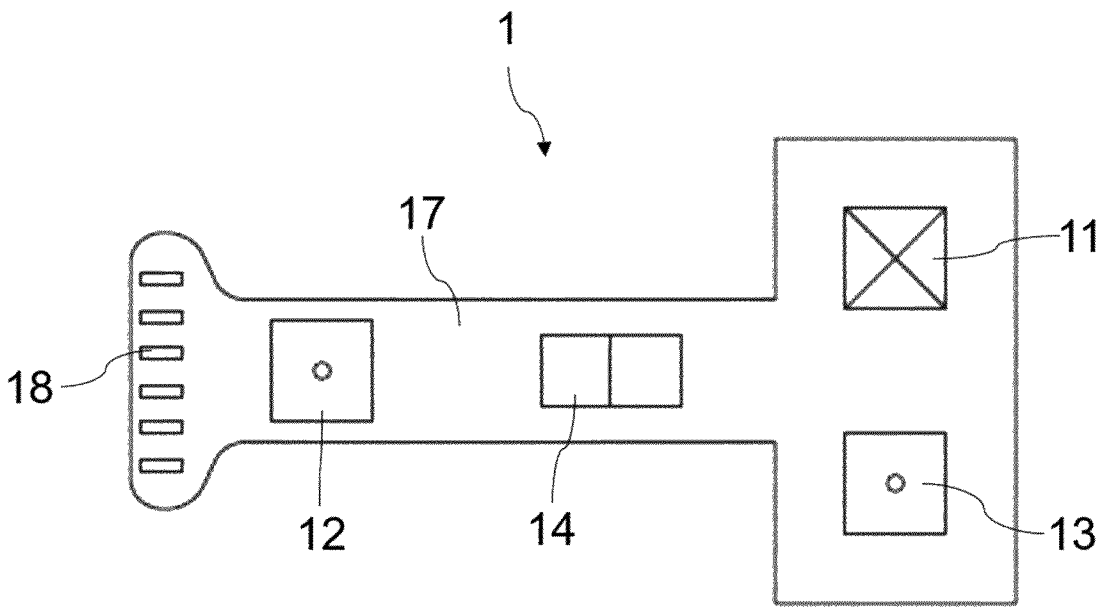
FIG. 3 shows a schematic of a second example of a flexible PCB of the first module according to the invention comprising a micro-electro-mechanical system loudspeaker.

The housing 4 of the earpiece 3 defines a cavity harboring a first module 10 (also termed transducer bundle herein) of the ear worn device 1, the first module 10 being formed for example by a flexible printed circuit board (PCB, see FIGS. 2 and 3).

In the depicted example, the first module 10 comprises a loudspeaker 11, e.g. a balanced armature, BA, loudspeaker, or a micro-electromechanical system, MEMS, loudspeaker, a first ambient microphone 12, particularly a micro-electromechanical system, MEMS, microphone, an in-ear microphone 13, particularly a micro-electromechanical system, MEMS, microphone, and a biometric sensor 14, for example, an optical sensor such as an infrared sensor.

At its first end 3*a*, the housing 4 further comprises a first channel 4*a* and a second channel 4*b* both extending parallel to the first longitudinal axis L1, when the first channel 4*a* and the second channel 4*b* are both open towards the ear canal 2*a* when the earpiece 3 of the ear worn device 1 is inserted into the ear canal 2*a*. The loudspeaker 11 is arranged with respect to the first channel 4*a*, such that sound emitted from the loudspeaker 11 can enter the ear canal 2*a* through the first channel 4*a*. In particular, the loudspeaker 11 may be used to playback sound, i.e. from an audio file or from the environment.

Likewise, the in-ear microphone 13 is arranged with respect to the second channel 4*b*, such that sound from inside the ear canal 2*a* can travel through the second channel 4*b* to be picked up by the in-ear microphone 13. The in-ear microphone 13 may be used to pick up sound from the user's body, such as the user's voice, chewing noises or the like which may be compensated by an algorithm to reduce distraction and produce a more natural sound.

The first ambient microphone 12 is arranged at the second end 3*b* of the earpiece 3 to pick up sound from the surrounding environment of the ear worn device 1. This may be used, e.g. for applications such as active noise cancelling or augmented hearing, i.e. to play back certain selected sounds from the environment while cancelling out other unwanted environmental sounds. In addition, the first ambient microphone 12 may be used to pick up the user's own voice, e.g. for voice calls or for talking to an automatic voice assistant.

Furthermore, the biometric sensor 14 is facing towards the outside of the earpiece 3 in a direction which is perpendicular to the first longitudinal axis L1. This orientation may be favorable to achieve close proximity with the tissue of the ear canal 2*a* (see FIGS. 5A and 5B) laterally surrounding the earpiece 3 to pick up biometric signals. For example, such signal may be a heart rate, a blood oxygen saturation, a respiration rate, blood glucose level, a hormone level or an electroencephalogram (EEG) signal of the user wearing the earpiece 3.

For example, the biometric sensor 14 may be a photoplethysmographic (PPG) sensor configured to pick up a heart rate or heart rate variability. According to a further example, the biometric sensor 14 may be an infrared (IR) sensor configured to pick up the body temperature of the user. Yet alternatively, the biometric sensor 14 may comprise an electrode configured to detect a galvanic skin response, an electroencephalogram or an electrocardiogram, particularly in combination with at least one further electrode arranged in the main body 5/second module 20 of the ear worn device 1.

Figure 4:
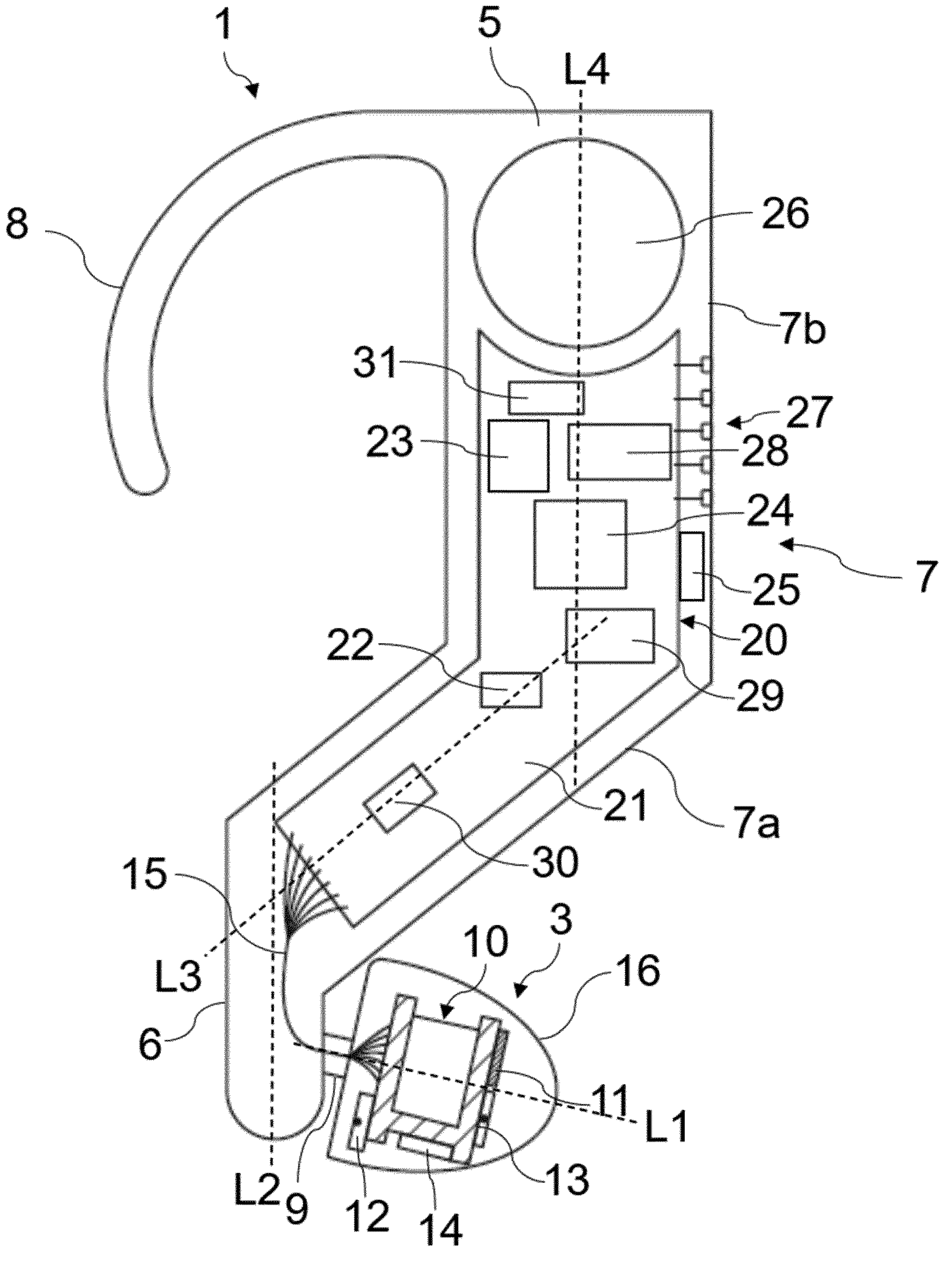
FIG. 4 shows a schematic of an example of the ear worn device according to the invention comprising the first module and the second module.

Electrical connections 15 are shown branching, e.g. from the flexible PCB harboring the components of the first module 10, towards the second module 20 in the main body 5 of the ear worn device 1 (see below). For example, the electrical connections 15 may be arranged inside a connector 9, particularly a flexible connector, as shown in FIG. 4.

Figure 5A:
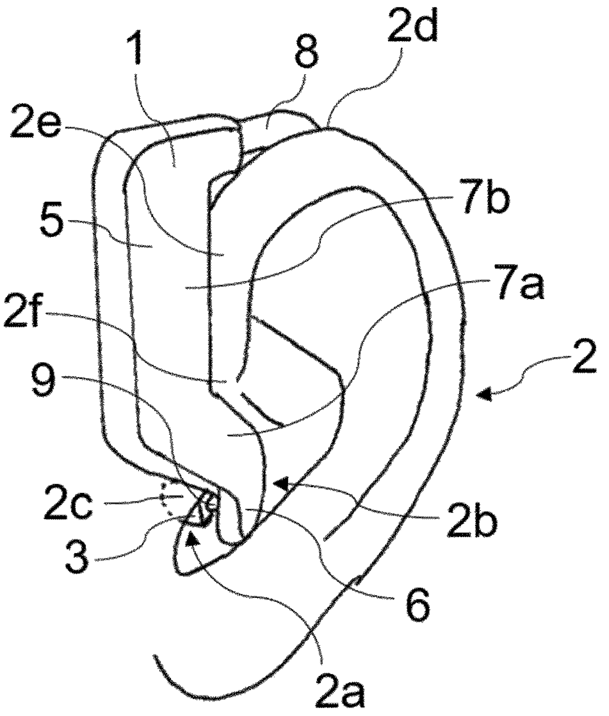
FIG. 5 shows the embodiment of the ear worn device depicted in FIG. 4 placed in an ear of a user.
Figure 5B:
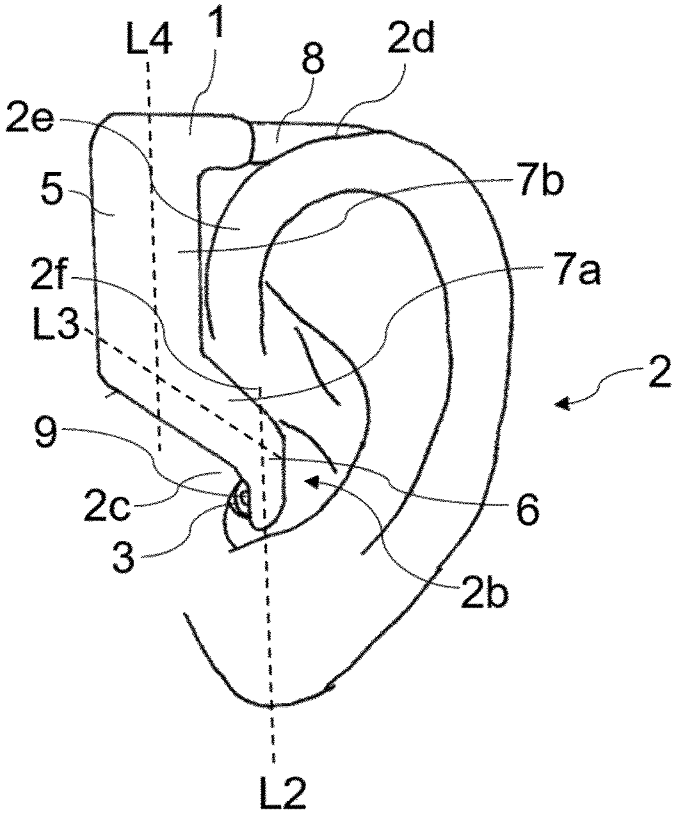

FIG. 1C shows a further embodiment of the earpiece 3 comprising a housing 4 with a first channel 4*a* and a second channel 4*b* oriented towards the ear canal 2*a* (see FIGS. 5A and 5B). The housing 4 harbors a first module 10 which comprises a loudspeaker 11, a first ambient microphone 12, an in-ear microphone 13, and a biometric sensor 14 in an alternative arrangement compared to FIG. 1B. The first module 10 is connected via electrical connections 15 to the second module 20 (not shown).

FIGS. 2A and B show an example of a flexible printed circuit board (PCB) 17 constituting the first module 10. According to this embodiment, the first module 10 comprises a balanced armature loudspeaker 11, a MEMS first ambient microphone 12, a MEMS in-ear microphone 13, a biometric sensor 14 and contacts 18 for connecting electrical connections 15 (see FIG. 1).

FIG. 2A shows the circuit board 17 in an extended configuration, such as during manufacture and before insertion into the housing 4 of the earpiece 3.

FIG. 2B illustrates a more compact folded configuration of the circuit board 17 shown in FIG. 2A which may result in the orientation of the components of the first module 10 as shown in FIG. 1B and described above.

FIG. 3 depicts an alternative embodiment of a flexible printed circuit board 17 constituting the first module 10 of the ear worn device 1. Compared to the embodiment shown in FIG. 2A, the balanced armature (BA) loudspeaker 11 is replaced by a MEMS loudspeaker 11.

FIG. 4 is a schematic view of the ear worn device 1 according to an embodiment of the invention. The ear worn device 1 comprises an earpiece 3 for insertion into the ear canal 2*a* (see FIGS. 5A and 5B), e.g., such as the one shown in FIG. 1B or C and described above, and a main body 5 to be worn on the outer ear while the earpiece 3 is inserted into the ear canal 2*a*.

The main body 5 comprises a housing which harbors the second module 20 of the ear worn device 1 which is electrically connected by electrical connections 15 to the first module 10 within the earpiece 3. The earpiece 3 is mechanically connected to the main body 5 by a connector 9 harboring the electrical connections 15.

The second module 20 is particularly implemented by an electronic component, 21, such as a further printed circuit board including electronic parts constituting the second module 20. In the example depicted in FIG. 4, the electronic component 21 comprises a movement and/or acceleration sensor 22, e.g. an inertial measurement unit, IMU, a microcontroller 23 including a communication device, e.g., a wireless interface, particularly based on the Bluetooth standard, a signal processing device 24, e.g., a microprocessor capable of processing sound picked up by the ambient and in ear microphones of the ear worn device 1, a second ambient microphone 25, particularly forming a microphone array with the first ambient microphone 12 to implement directional hearing features, a memory 29, e.g. a flash memory, capable of storing data, an amplifier 30, particularly to drive the loudspeaker 11 of the first module 10, and a light emitter 31, e.g. a light-emitting diode, LED, particularly as part of a user interface of the ear worn device 1. The second ambient microphone 25 may be used to pick up the user's own voice, e.g. for voice calls or for talking to an automatic voice assistant.

The second module 20 further comprises a power source 26, e.g. a rechargeable battery, for providing the electrical power used to operate particularly the microphones 12, 13, 25, the loudspeaker 11 and the biometric sensors 14 of the ear worn device as well as other electronic components.

Recharging of the power source 26 via charging contacts 27 as well as distribution of the electrical power is implemented by a power controller 28 incorporated in the second module 20.

The shape of the ear worn device 1 according to the embodiment shown in FIG. 4 is now more closely described with additional reference to FIG. 5 showing the ear worn device 1 placed in an ear 2 of a user in a perspective view (FIG. 5A) and a front view (FIG. 5B).

The main body 5 of the ear worn device 1 comprises a first section 6 extending along a second longitudinal axis L2, the first section 6 being connected to the earpiece 3 via the connector 9, a second section 7 comprising a first subsection 7*a* extending along a third longitudinal axis L3 and a second subsection 7*b* extending along a fourth longitudinal axis L4 parallel to the second longitudinal axis L2, and a third section 8 forming a hook to be placed behind the wearer's ear.

The angle formed between the first longitudinal axis L1 of the earpiece 3 and the second longitudinal axis L2 of the first section 6 is approximately 100° to 120°, such that the first section 6 runs straight up behind the tragus 2*c* towards the helicis crus 2*f* (see FIGS. 5A and 5B) when the earpiece 3 is inserted into the ear canal 2*a*. Importantly, this results in the concha cava 2*b* of the ear 2 being unobstructed which allows to use the natural filtering abilities of the ear 2 to produce an more natural playback of the environmental sounds picked up by the first ambient microphone 12 (and optionally the second ambient microphone 25 and/or further ambient microphones).

The second section 7 of the main body 5 extends essentially along the helix 2*e* of the ear 2. This may be achieved, e.g., by two or more straight subsections, such as the first subsection 7*a* and second subsection 7*b* depicted in FIG. 4, or alternatively by a curved second section 7.

The third section 8, which is connected to the second section 7, forms a hook which can be placed behind the auricle 2*d* of the ear 2 to firmly keep the ear worn device 1 in position while the earpiece 3 is positioned in the ear canal 2*a*.

Figure 6:
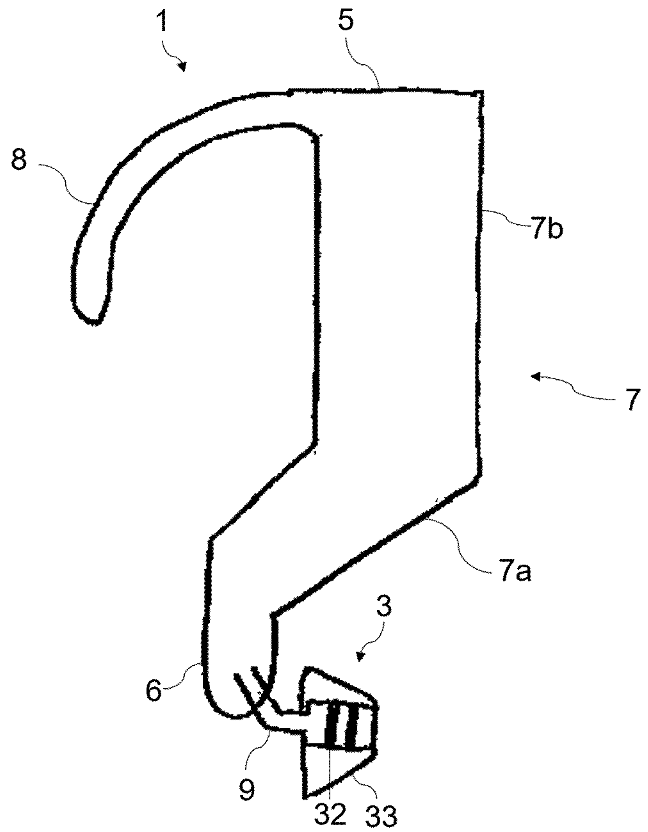
FIG. 6 depicts a further embodiment of the ear worn device comprising an earpiece with a core part and a sleeve part.

FIG. 6 illustrates an ear worn device 1 according to the present invention comprising a main body 5 and an earpiece 3 connected by a connector 9. The main body 5 of the ear worn device 1 comprises the same shape as the main body 5 of the device 1 shown in FIG. 4, and the internal components of the main body 5 main be the same or similar to those described above for the embodiment shown in FIG. 4.

Figure 7:
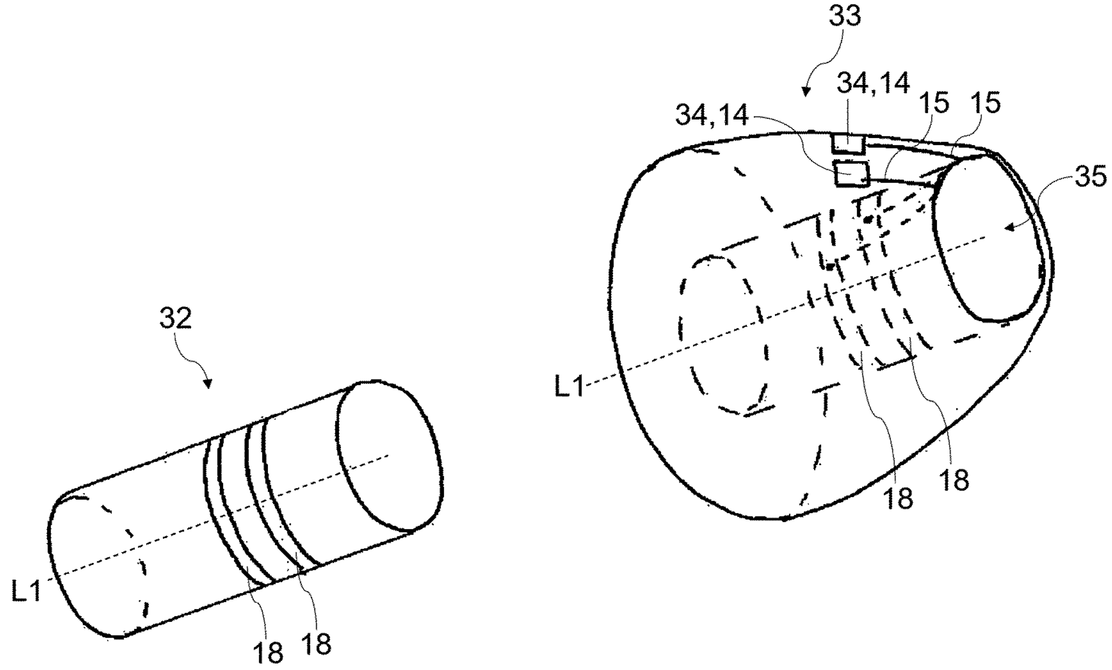
FIG. 7 shows the core part and the sleeve part of the earpiece of the ear worn device shown in FIG. 6 in a disassembled state.
Figure 8:
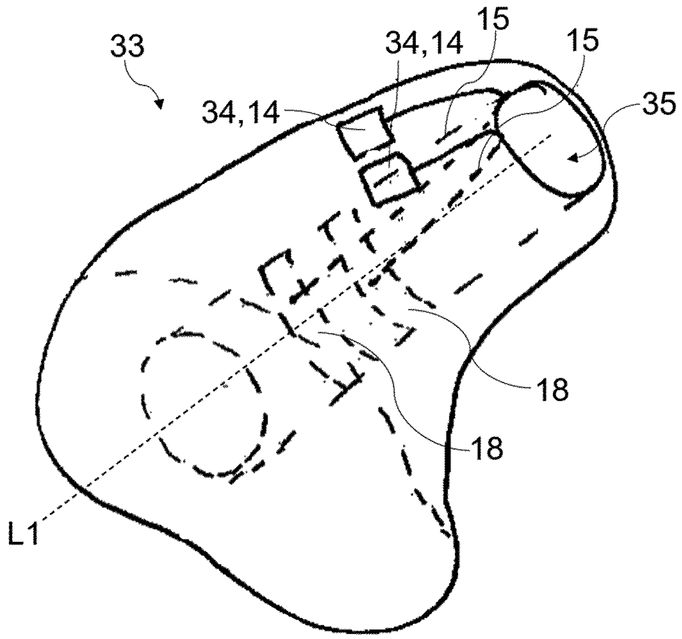
FIG. 8 shows a further embodiment of the sleeve part of the earpiece of the ear worn device which is custom-fit to a user's ear canal.

However, the earpiece 3 of the device 1 shown in FIG. 6 consists of two separate and connectable parts, a core part 32 and a sleeve part 33, which are shown in a disassembled state in FIGS. 7 and 8.

The first module 10 described above may be arranged completely inside of the core part 32, or alternatively, some components of the first module 10 may be arranged in the core part 32 and other components of the first module 10 may be arranged in the sleeve part 33.

The core part 32 is mechanically connected to the main body 5 by the connector 9, and electrical connections may lead from components of the first module 10 in the core part 32 through the connector 9 to the second module 20 in the main body 5.

For connection to the core part 32, the sleeve part 33 particularly comprises a through-hole 35, e.g., a cylindrical through-hole extending a along the first longitudinal axis L1. The core part 32 is particularly shaped as a cylindrical body which can be inserted into the through-hole 35. Optionally, a locking mechanism (not shown) can be provided to achieve a snapping connection between the core part 32 and the sleeve part 33, when the core part 32 is inserted into the sleeve part 33.

The core part 32 particularly comprises a rigid housing and the sleeve part is particularly formed at least partially from a softer, flexible material, e.g. silicone, which shape can adapt to the shape of the ear canal of the user to achieve a tight fit in the ear canal.

As shown in FIGS. 7 and 8, the sleeve part may comprise one or several skin contact sensors 34, which may function as biometric sensors 14, e.g. as a PPG sensor that can be used to determine the heart rate from measuring blood flow under the skin. The skin contact sensors 34 are arranged on the outside surface of the sleeve part 33, such that they are in contact with the skin on the inner surface of the ear canal to pick up biometric signals when the user is wearing the ear worn device 1.

Due to this location of the sensors 34, it is possible to leave the concha cava unobstructed to use the natural filtering abilities of the ear.

Due to this location of the sensors 34, it is possible that the sensors can pick up a more accurate reading in this location, particularly a more accurate reading of a biometric signal. In an embodiment in that the sensor 34 is a thermometer 34 (particularly a contact thermometer 34), due to the location of the thermometer 34, the core body temperature can be detected.

The skin contact sensors 34 are connected to electrical connection contacts 18 on the inner surface of the through-hole 35 by electrical connections 15. According to the examples shown in FIGS. 7 and 8, the connection contacts 18 are formed by circumferentially extending rings of a conductive material on the inside surface of the through-hole 35.

The core part 32 comprises corresponding electrical connection contacts 18 on its outer surface, e.g. in form of circumferentially extending rings of a conductive material on the outside surface of the core part 32 (see FIG. 7).

When the core part 32 is inserted into the sleeve part 33, the connection contacts 18 of the core part 32 and the sleeve part 33 are aligned to establish an electrical connection between the skin contact sensors 34 and components of the first module 10 in the core part 32.

FIG. 8 shows an alternatively shaped embodiment of the sleeve part 33. The outer surface of this sleeve part is custom-fit to an ear canal of a user to achieve optimal fit and wearing comfort.

| List of reference signs | |
|---|---|
| Ear worn device | 1 |
| Ear | 2 |
| Ear canal | 2a |
| Concha cava | 2b |
| Tragus | 2c |
| Auricle | 2d |
| Helix | 2e |
| Helicis crus | 2f |
| Earpiece | 3 |
| First side | 3a |
| Second side | 3b |
| Housing | 4 |
| First channel | 4a |
| Second channel | 4b |
| Main body | 5 |
| First section | 6 |
| Second section | 7 |
| First subsection | 7a |
| Second subsection | 7b |
| Third section | 8 |
| Connector | 9 |
| First module | 10 |
| Loudspeaker | 11 |
| First ambient microphone | 12 |
| In-ear microphone | 13 |
| Biometric sensor | 14 |
| Electrical connection | 15 |
| Housing | 16 |
| Circuit board | 17 |
| Connection contact | 18 |
| Second module | 20 |
| Electronic component | 21 |
| Movement and/or acceleration sensor | 22 |
| Microcontroller | 23 |

-continued

| List of reference signs | |
|---|---|
| Signal processing device | 24 |
| Second ambient microphone | 25 |
| Power source | 26 |
| Charging contact | 27 |
| Power controller | 28 |
| Memory | 29 |
| Amplifier | 30 |
| Light emitter | 31 |
| Core part | 32 |
| Sleeve part | 33 |
| Skin contact sensor | 34 |
| Through-hole | 35 |
| First longitudinal axis | L1 |
| Second longitudinal axis | L2 |
| Third longitudinal axis | L3 |
| Fourth longitudinal axis | L4 |

The invention claimed is:

1. An ear worn device (1), particularly a wireless headphone or a hearing aid, comprising a. a first module (10) configured to be inserted at least partially into an ear canal (2*a*) of a user, wherein the first module (10) comprises a loudspeaker (11) configured to emit sound into the ear canal (2*a*) of the user, and wherein the first module (10) comprises at least one microphone (12, 13) configured to pick up sound, including a first ambient microphone (12) configured to be arranged behind the tragus (2*c*) of the ear (2) of the user adjacent to the ear canal (2*a*) and face away from the ear canal (2*a*) when the first module is inserted into said ear canal (2*a*), such that the concha cava (2*b*) of the ear (2) of the user remains unobstructed, b. a second module (20), wherein the second module is configured to be arranged outside of the concha cava (2*b*) adjacent to said ear canal (2*a*) of the user when the first module (10) is inserted into said ear canal (2*a*), wherein the second module (20) comprises at least one electronic component (21) which is operatively coupled to the loudspeaker (11) and/or the at least one microphone (12, 13) of the first module (10), and c. a housing (16) covering at least the first module (10), wherein the housing (16) is configured to seal the ear canal (2*a*) of the user.

2. The ear worn device (1) according to claim 1, characterized in that the ear worn device (1) comprises an earpiece (3) configured to be inserted at least partially into said ear canal (2*a*), wherein the earpiece (3) comprises the first module (10) and wherein the ear worn device (1) comprises a main body (5) connected to the earpiece (3), wherein the main body (5) comprises the second module (20), and wherein the main body (5) comprises a first section (6) connected to the earpiece (3), wherein the ear worn device (1) is configured such that the first section (6) extends upward from the ear canal (2*a*) behind the tragus (2*c*) towards the helicis crus (2*f*) of the ear (2) when the earpiece is (3) inserted into the ear canal (2*a*), such that the concha cava (2*b*) of the ear (2) remains unobstructed, wherein particularly the main body (5) further comprises a second section (7) connected to the first section (6), wherein the ear worn device (1) is configured such that the second section (7) extends from the helicis crus (2*f*) along an outside of the helix (2*e*) of the ear (2) of the user when the earpiece (3) is inserted at least partially into the ear canal (2*a*) of the ear (2).

3. The ear worn device (1) according to claim 2, characterized in that the earpiece (3) comprises a core part (32) and a sleeve part (33), wherein the sleeve part (33) is mechanically connectable to the core part (32), such that the sleeve part (33) is arranged around the core part (32).

4. The ear worn device (1) according to claim 2, characterized in that the main body (5) further comprises a third section (8) connected to the second section (7), wherein the third section (8) forms a hook configured to be arranged behind the auricle (2*d*) of the ear (2) when the earpiece (3) is inserted at least partially into the ear canal (2*a*) of the ear (2).

5. The ear worn device (1) according to claim 1, characterized in that the at least one microphone (12, 13) of the first module comprises an in-ear microphone (13) facing into the ear canal (2*a*) when the first module is inserted into said ear canal (2*a*), wherein the in-ear microphone (13) is configured to pick up sound from inside the ear canal (2*a*) of the user.

6. The ear worn device (1) according to claim 1, characterized in that the first module (10) comprises a biometric sensor (14) configured to pick up a biometric signal, wherein particularly the at least one electronic component (21) of the second module (20) is operatively coupled to the biometric sensor (14), wherein particularly the biometric signal is a heart rate, a blood oxygen saturation, a body temperature, a respiration rate, blood glucose level, a hormone level, an electroencephalogram (EEG) signal of the user, or a sound signal picked up from inside the body of the user.

7. The ear worn device (1) according to claim 1, characterized in that the ear worn device (1) comprises a first electrode and a second electrode configured to detect a galvanic skin response, an electroencephalogram or an electrocardiogram, wherein particularly the first electrode is comprised in the first module (10) and the second electrode is comprised in the second module (20).

8. The ear worn device (1) according to claim 1, characterized in that the ear worn device (1), particularly the first module (10), comprises a contact sensor configured to pick up sounds from inside the body of the user when the user wears the ear worn device (1), particularly when the first module (10) is inserted at least partially into the ear canal (2*a*) of the user.

9. The ear worn device (1) according to claim 1, characterized in that the second module (20) comprises at least one second ambient microphone (25) forming a microphone array with the first ambient microphone (12) of the first module (10) to achieve directional listening.

10. The ear worn device (1) according to claim 1, characterized in that the second module (20) comprises a movement and/or acceleration sensor (22), particularly an inertial measurement unit, wherein particularly the movement and/or acceleration sensor (22) is comprised in the at least one electronic component (21).

11. The ear worn device (1) according to claim 1, characterized in that the second module (20) comprises a communication device, particularly comprising a radio antenna, more particularly a radio antenna configured to receive and/or transmit signals at a frequency between 2,402 GHz and 2,480 GHz, wherein particularly the communication device is comprised in the at least one electronic component (21).

12. The ear worn device (1) according to claim 1, characterized in that the second module (20) comprises a signal processing device (24) configured to process signals obtained from the at least one microphone (12, 13, 25), particularly the first ambient microphone (12), the second ambient microphone (25) and/or the in-ear microphone (13), wherein particularly the ear worn device (1) is configured to play back the processed signals to the loudspeaker (11) of the first module (10), wherein particularly the signal processing device (24) is comprised in the at least one electronic component (21).

13. The ear worn device (1) according to claim 1, characterized in that the at least one electronic component (21) is operatively coupled to the loudspeaker (11) and/or the at least one microphone (12, 13) of the first module (10) by an electric connection (15).

* * * * *